United States Patent [19]
Shinomiya

[11] Patent Number: 5,474,371
[45] Date of Patent: Dec. 12, 1995

[54] DIAGONAL BRAKING CIRCUIT WITH PARALLEL THROTTLE AND CHECK VALUE

[75] Inventor: Takashi Shinomiya, Hyogo, Japan

[73] Assignee: Sumitomo Electric Industries, Ltd., Osaka, Japan

[21] Appl. No.: 287,406

[22] Filed: Aug. 5, 1994

Related U.S. Application Data

[62] Division of Ser. No. 982,566, Nov. 27, 1992, abandoned.

[30] Foreign Application Priority Data

Nov. 30, 1991 [JP] Japan .................................. 3-317159
Dec. 27, 1991 [JP] Japan .................................. 3-346950

[51] Int. Cl.$^6$ .................................................. B60T 8/00
[52] U.S. Cl. ....................................... 303/117.1; 303/900
[58] Field of Search ........................... 303/113.1, 115.4, 303/117.1, 84.1, 84.2, 900, 901, DIG. 1, DIG. 2, 9.71, 9.73, 9.74

[56] References Cited

U.S. PATENT DOCUMENTS

| | | | |
|---|---|---|---|
| 4,929,037 | 5/1990 | Farr | 303/116.4 |
| 4,952,002 | 8/1990 | Arikawa et al. | 303/900 X |
| 5,135,292 | 8/1992 | Friedow | 303/900 X |
| 5,401,086 | 3/1995 | Nishikimi et al. | 303/DIG. 2 X |

FOREIGN PATENT DOCUMENTS

| | | |
|---|---|---|
| 0171901 | 2/1986 | European Pat. Off. . |
| 0202845 | 11/1986 | European Pat. Off. . |
| 0275840 | 7/1988 | European Pat. Off. . |
| 0332399 | 9/1989 | European Pat. Off. . |
| 0361502 | 4/1990 | European Pat. Off. . |
| 3936697 | 5/1990 | Germany . |
| 4029846 | 4/1991 | Germany . |
| 1297350 | 11/1989 | Japan . |
| 2128952 | 5/1990 | Japan .................................. 303/901 |

*Primary Examiner*—Josie A. Ballato

[57] ABSTRACT

Disclosed is an antilock brake control fluid pressure system, when in effecting antilock control, fluid is supplied from a pump to the flow valve by way of a second fluid inlet. Furthermore, in order to achieve one-way supply of fluid from the master cylinder to the second fluid inlet, a check valve is arranged in parallel with a throttle between the master cylinder and the second fluid inlet. With the above arrangement, a continuous fluid supply is achieved from the master cylinder to the second fluid inlet by way of the check valve even when no fluid exists in an expansion chamber, thereby enabling a metal-edge control at the second fluid inlet allowing the first fluid inlet to be kept in a cut-off condition to thereby suppress reverse pulsation, pump noise, and vibration to the brake pedal.

2 Claims, 8 Drawing Sheets

Normal Braking Mode

Antilock Control Mode

Normal Braking Mode

Antilock Control Mode

5,474,371

DIAGONAL BRAKING CIRCUIT WITH PARALLEL THROTTLE AND CHECK VALUE

This application is a division, of application Ser. No. 07/982,566, filed Nov. 27, 1992, now abandoned.

BACKGROUND OF THE INVENTION

1. Field of the Invention

The present invention relates to an antilock brake control fluid pressure system, and more particularly to an antilock brake control fluid pressure system for use in an automobile for the purpose to secure a minimum brake distance while preventing, at the time of braking, the automobile from loosing its directional stability and steering capability due to locking of a wheel.

2. Description of the Prior Art

Generally in an antilock brake control fluid pressure system for use in an automobile and the like, locking of a wheel is detected based on a slip speed which is a difference between a moving speed of the automobile and a rotating speed of the wheel at the time of braking to control brake pressure, and upon detection of the locking of the wheel, the brake pressure is reduced to regain the wheel speed up to an appropriate slip speed so as to achieve a minimized braking distance while avoiding the locking of the wheel.

Conventionally, as an antilock brake control fluid pressure system of the above type, there has been a known technique as shown in FIGS. 7 and 8 (disclosed in the Japanese Patent Unexamined Laid-Open Publication No. HEI 1-297350). According to the above-known technique, there is provided an expansion chamber 12 for accommodating fluid which is released from brake pressure when antilock control is effected. According as the brake pressure reduces, a spool type flow valve 6 moves downward, and a first fluid inlet 7 formed in a modulator 4 is closed to cut off supply of fluid from the master cylinder 1 into the flow valve 6 by way of the first fluid inlet 7.

Synchronously with effecting antilock control as shown in FIG. 8, a pump 5 is activated by a motor M, and an output from the pump 5 diverges into two ways one of which returns to the master cylinder 1 by way of a throttle 10, and the other is supplied to the inside of the flow valve 6 by way of a second fluid inlet 8 under a metal-edge control. With the above-mentioned operations, the output from the pump 5 in an antilock control operation is input to the inside of the flow valve 6 by way of the second fluid inlet 8 to increase the brake pressure on one hand while the output is fed back to the master cylinder 1 by way of the throttle 10 on the other hand. Therefore, when the expansion chamber 12 is filled with sufficient fluid, pulsation from the pump 5 to the master cylinder 1 is restricted by the throttle 10 to reduce pump noise as well as the vibration of a brake pedal 13.

However, in the conventional antilock brake control fluid pressure system as shown in FIG. 8, practically the expansion chamber 12 is almost empty inside except for the time immediately after reducing brake pressure because the pumping capability of the pump 5 is so designed as to have a sufficient capacity with respect to the amount of fluid corresponding to brake pressure reduction. Therefore, even when the pump 5 is operated, no sufficient fluid is continuously supplied to the second fluid inlet 8 of the flow valve 6. Therefore, the flow valve 6 is possibly pushed back to its position before effecting antilock control as shown in FIG. 7 due to the reduction of fluid pressure inside the flow valve 6 even when antilock control is effected.

Consequently, the master cylinder 1 is communicated with the pump 5 by way of the first fluid inlet 7 and the second fluid inlet 8. When the pump 5 is operated to generate an output in the above condition, the output is transmitted as pulsation to the master cylinder 1 by way of the second fluid inlet 8 of the spool modulator 4, a fluid path in the flow valve 6, and the first fluid inlet 7. The pulsation is transmitted via the brake pedal 13 to a driver as an unpleasant vibration. The same unpleasant feeling is given to the driver when the vertical movement of the flow valve 6 is transmitted as a noise source from the modulator 4 to the brake pedal 13. For the above reasons, it has been impossible to sufficiently suppress the transmission of pulsation such as the pump noise to the brake pedal.

In order to supply sufficient fluid from the master cylinder 1 to the second fluid inlet 8, it can be considered to increase the bore of the throttle 10 interposed therebetween. In such a case, pulsation from the pump 5 is disadvantageously transmitted to the master cylinder 1 without being sufficiently suppressed by the throttle 10.

SUMMARY OF THE INVENTION

Accordingly, an essential object of the present invention is to provide an antilock brake control fluid pressure system capable of preventing unnecessary movement of a flow valve, securely cutting off a first fluid inlet of a modulator in an antilock control mode thereby to suppress the transmission of pulsation such as a pump noise to a brake pedal when antilock control is effected.

According to the present invention, the above-mentioned objective is achieved by providing a check valve (11) in a bypass manner in parallel with a throttle (10) provided between a master cylinder (1) and a second fluid inlet (8) of a modulator (4) to enable continuous supply of fluid pressure to the second fluid inlet (8) regardless of the presence or absence of fluid in an expansion chamber (12) in an antilock control mode.

According to another feature of the present invention, the check valve (11) can be formed integrally with the throttle (10).

The antilock brake control fluid pressure system of the present invention is characterized in that:

supply of fluid from the master cylinder to a wheel brake is controlled by the flow valve provided inside the modulator;

a pump is provided to supply fluid to the wheel brake to automatically apply pressure again to the wheel brake after the pressure applied to the wheel brake is firstly released for the purpose to prevent the locking of the wheel brake;

first and second fluid inlets are formed in the modulator to communicate the master cylinder with the flow valve;

the fluid pressure from the master cylinder is supplied to the flow valve by way of the first and second fluid inlets in a normal braking operation mode before effecting antilock control to thereby apply fluid pressure to the wheel brake;

the flow valve is so arranged as to slide in a vertical direction according to the difference in pressure between the fluid pressure from the master cylinder and the fluid pressure from the wheel brake in effecting antilock control to close the first fluid inlet and thereby cut off the supply of fluid pressure from the master cylinder to the wheel brake by way of the first fluid inlet;

the pump is operated in response to an antilock control signal to supply the delivery fluid of the pump to the flow valve by way of the second fluid inlet; and the check valve 11 is arranged in a bypass manner in parallel with the throttle 10 between the first and the second fluid inlets so that the fluid pressure from the master cylinder is supplied to the inside of the flow valve by way of the check valve 11.

According to the present invention, by providing the check valve 11 as described above, the fluid is continuously supplied from the master cylinder 1 to the second fluid inlet 8 by way of the check valve 11 even when no fluid is stored in the expansion chamber 12, enabling to effect the metal-edge control at the second fluid inlet 8 while completely cutting off the flow of the fluid through the first fluid inlet 7 to thereby suppress reverse pulsation, pump noise, and vibration to the brake pedal.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
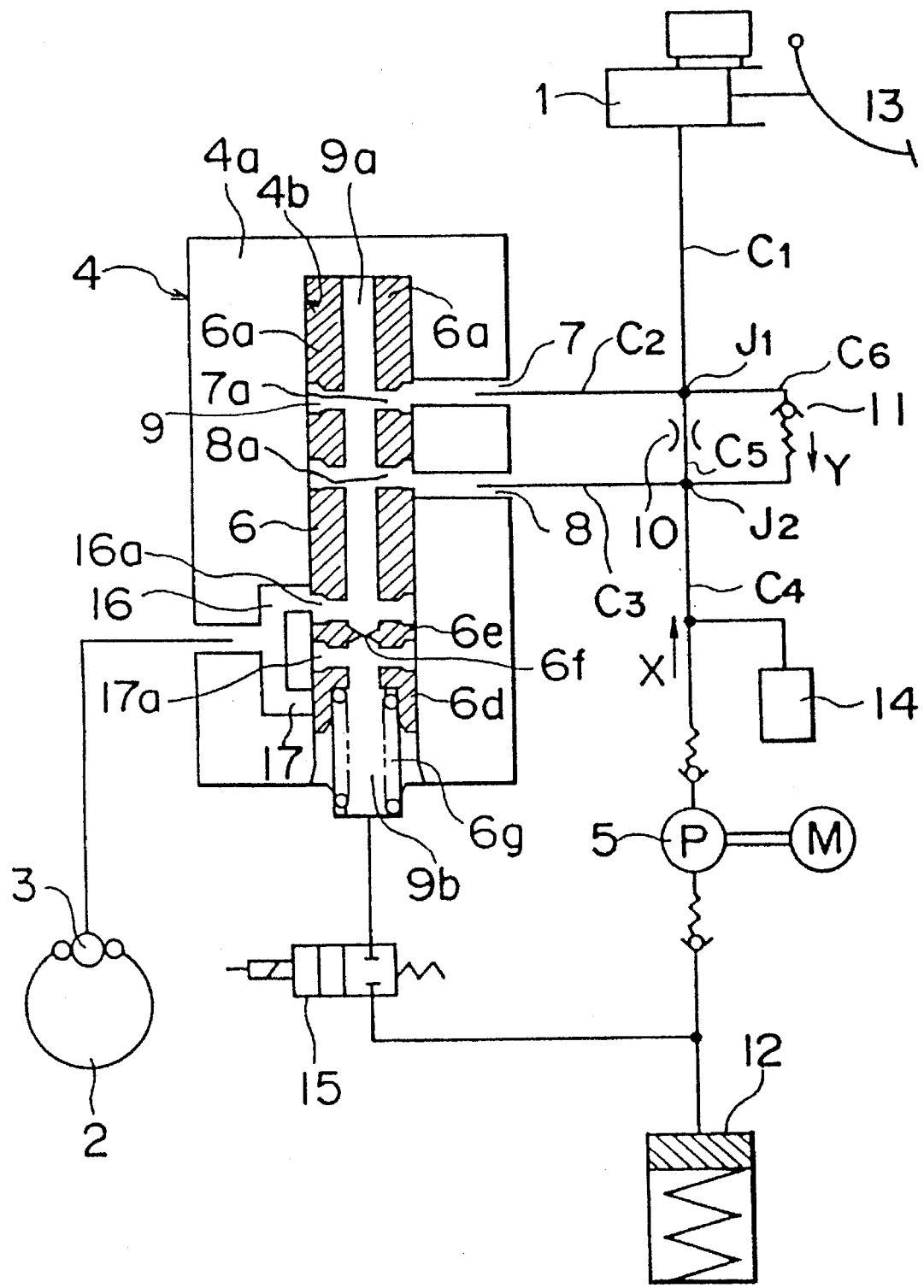
FIG. 1 is a schematic view of a first embodiment of the present invention in a condition before effecting antilock control.
Figure 2:
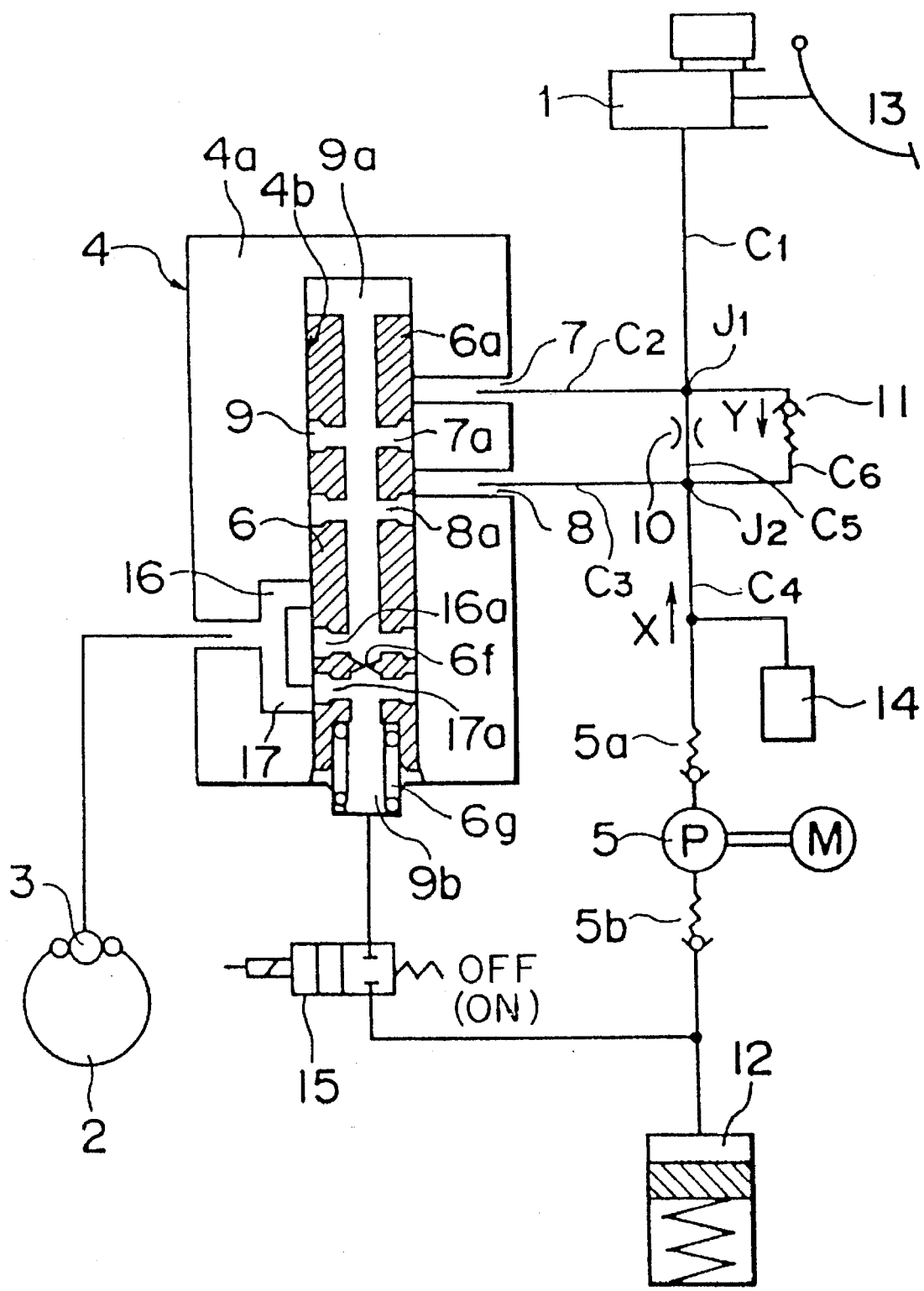
FIG. 2 is a schematic view of the embodiment in effecting antilock control.
Figure 3:
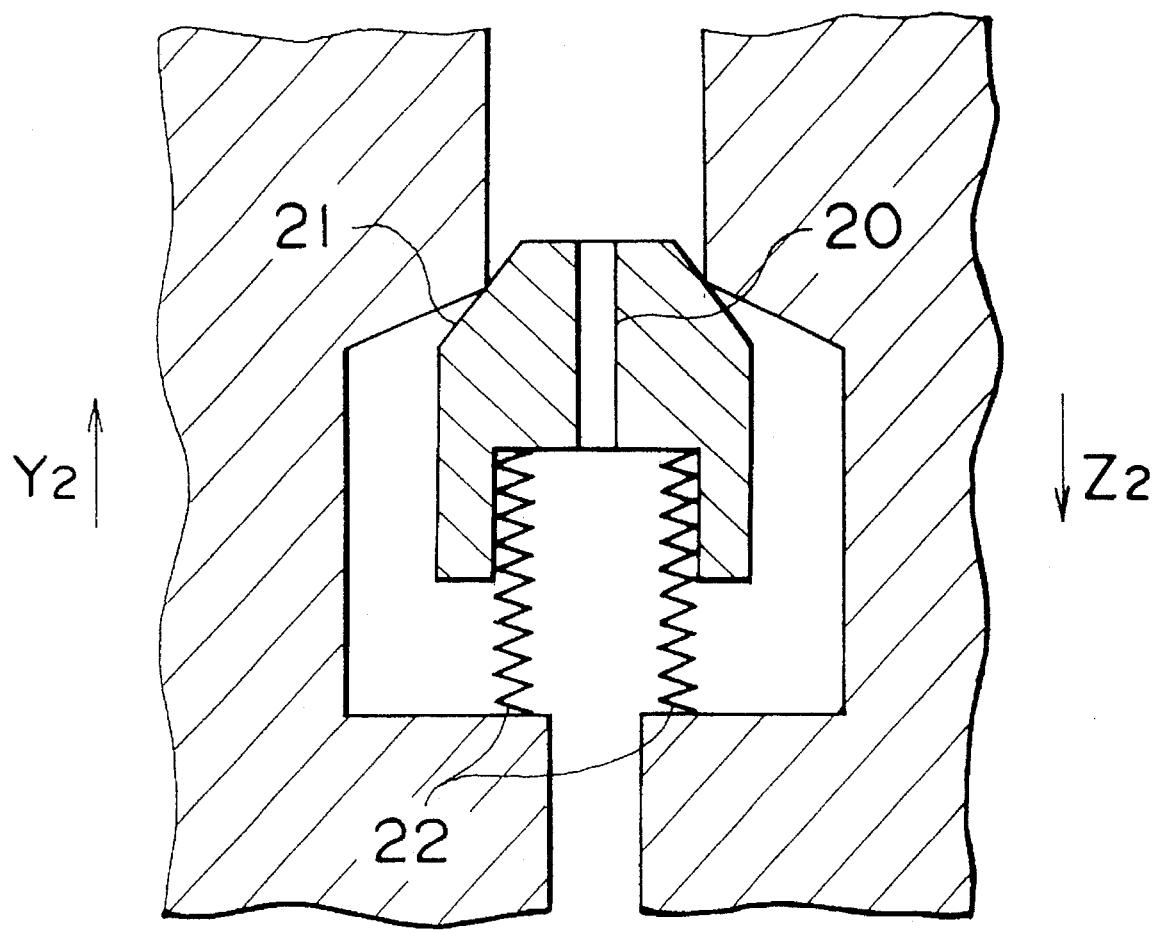
FIG. 3 is a sectional view of means where a throttle and a check valve are integrated for use in an embodiment of the present invention.

The following describes in detail a first embodiment of the present invention with reference to FIGS. 1 through 3. It is noted here that the basic construction of the present embodiment is the same as the conventional example, like numerals refer to like parts.

FIG. 1 illustrates an arrangement in a normal braking operation of an antilock brake control fluid pressure system in accordance with a first embodiment of the present invention. Referring to FIG. 1, designated by reference numeral 1 is a master cylinder, 2 is a wheel, 3 is a brake, and 4 is a modulator. The brake 3 has a wheel cylinder type construction in which brake control is effected by increasing or decreasing fluid pressure. The modulator 4 comprises a housing 4a having a cylindrical sliding inner surface 4b formed, and a spool type flow valve 6 is mounted axially and slidably in the sliding surface 4b.

The master cylinder 1 is connected to a first fluid inlet 7 formed in the housing 4a by way of a fluid path line C1, a junction J1, and a fluid path line C2 on one hand, and is also connected to a second fluid inlet 8 formed in the housing 4a by way of the line C1, the junction J1, a fluid path line C5, a junction J2, and a fluid path line C3. The line C5 is provided with a throttle 10 interposed between the junction J1 and the junction J2 to regulate fluid flow in the vertical direction. The junctions J1 and J2 are connected to each other by way of a bypass fluid path line C6 arranged in parallel with the line C5. The bypass line C6 is provided with a check valve 11 for limiting the fluid flow in one direction (in the direction Y from J1 to J2). Therefore, the master cylinder 1 is connected to the second fluid inlet 8 by way of the bypass line C6 comprised of the junction J1, the check valve 11, and the junction J2.

The first and second fluid inlets 7 and 8 are formed approximately opposite to first and second ports 7a and 8a for the fluid path formed in the flow valve 6 as communicated with a fluid path 9 formed axially and centrally in the flow valve 6. The fluid path 9 axially formed in the flow valve 6 is separated into an upper cylinder chamber 9a and a lower cylinder chamber 9b by a bulkhead section 6e. Centrally in the bulkhead section 6e is formed an orifice 6f to permit slight fluid communication between the upper cylinder chamber 9a and the lower cylinder chamber 9b.

Above and below the bulkhead section 6e are respectively formed third and fourth ports 16a and 17a which are connected to the brake 3 of the wheel 2 by way of a fluid outlet 16 and a drain 17 respectively formed in the housing 4a.

The lower cylinder chamber 9b of the flow valve 6 is connected to the expansion chamber 12 by way of a solenoid valve 15, and the expansion chamber 12 is connected to the second fluid inlet 8 by way of the pump 5, a fluid path line C4, the junction J2 and line C3.

The following describes the operation of the present fluid pressure system.

Referring to FIG. 1, when antilock control is not effected, i.e., in a normal braking mode before effecting antilock control, the flow valve 6 is in its uppermost position by a spring 6g, while the first and second fluid inlets 7 and 8 are communicated with the upper cylinder chamber 9a by way of the first and second ports 7a and 8a respectively and further communicated with the brake 3 by way of the third port 16a and the fluid outlet 16. At this time, the drain 17 formed in the housing 4a is sealed by a valve body 6d.

When the driver steps on the brake pedal 13, the pressure of fluid filled up in the master cylinder 1 is transmitted to the brake 3 of the wheel 2 by way of the modulator 4. In other words, the fluid pressure applied from the master cylinder 1 is transmitted to the first and second fluid inlets 7 and 8 by way of the lines C1, C2, and C3 and further transmitted to the upper cylinder chamber 9a of the flow valve 6 by way of the first and second ports 7a and 8a and then transmitted to the brake 3 of the wheel 2 by way of the third port 16a and the fluid outlet 16.

The following describes the antilock control operation with reference to FIG. 2.

When the brake pressure of fluid is increased to detect a symptom of locking of a wheel by a well-known detection means (not shown), an antilock control signal is generated to turn on the solenoid valve 15. With the ON operation of the solenoid valve 15, the fluid inside the wheel cylinder of the brake 3 is drained by way of the drain 17, the fourth port 17a, the lower cylinder chamber 9b, and the solenoid valve 15 to be temporarily stored in the expansion chamber 12. At this time, fluid pressure inside the lower cylinder chamber 9b is reduced to make the flow valve 6 move downward, and consequently the first fluid inlet 7 is closed by the valve body 6a of the flow valve 6. Therefore, fluid supply from the master cylinder 1 to the first fluid inlet 7 is cut off.

When the brake pressure is reduced with the downward movement of the flow valve 6, the wheel rotating speed is recovered to an appropriate speed. Synchronously with generation of the antilock control signal, a motor M is turned on to operate the pump 5 which pumps up the fluid stored in the expansion chamber 12 to supply the fluid to the second fluid inlet 8 by way of the line C4, the junction J2, and the line C3. With the above-mentioned fluid supply operation, fluid enters into the upper cylinder chamber 9a through a narrow gap defined between the second fluid inlet 8 and the second port 8a to thereby increase the fluid pressure inside the upper cylinder chamber 9a. Therefore, the flow valve 6 moves down to completely close the above-mentioned gap. Subsequently, the fluid inside the upper cylinder chamber 9a is discharged by way of the throttle orifice 6f, and therefore the fluid pressure inside the upper cylinder chamber 9a reduces to move the flow valve 6 upward by the biasing force of the spring 6g. The above-mentioned operations are repeated to make the flow valve 6 move slightly up and down forming and closing the above-mentioned narrow gap. In other words, a metal-edge control is effected between the second fluid inlet 8 and the second port 8a.

Since check valves 5a and 5b are provided respectively on the output side and input side of the pump 5 on the line C4, fluid flows only in one direction (indicated by the arrow X). Furthermore, a damping chamber 14 is provided on the output side of the pump 5 to damp the pump pulsation. In the above case, output fluid of the pump 5 is slightly fed back to the master cylinder 1 by way of the throttle 10 of the line C5, however, noise such as pump pulsation is sufficiently suppressed by the throttle 10.

Furthermore, according to the present invention, since the check valve 11 is provided on the line C6, the fluid fed to the second fluid inlet 8 includes not only the fluid delivered from the pump 5 but also the fluid fed from the master cylinder 1 by way of the bypass line C6.

Therefore, fluid is continuously supplied from the master cylinder 1 to the second fluid inlet 8 by way of the check valve 11 even when no fluid exists in the expansion chamber 12, which also enables to effect the metal-edge control at the second fluid inlet 8. In effecting antilock control, the first fluid inlet 7 is continuously maintained in the cutoff condition to prevent the pump pulsation, pump noise, vibration, and the like from being transmitted to the pedal 13.

When locking of the wheel is avoided, the solenoid valve 15 is turned off to close the fluid path to the expansion chamber 12.

Although the check valve 11 is arranged in parallel with the throttle 10 in a bypass manner, it is also possible to integrate the check valve with the throttle as shown in FIG. 3.

Referring to FIG. 3, the numeral 21 denotes a check valve on valve plug which has an upper portion tapered and a lower portion having a flange-like configuration to which a biasing force of a spring member 22 is applied. Furthermore, a narrow fluid path on throttle 20 is formed axially through the valve plug 21. With the above-mentioned arrangement, fluid flow receives a great resistance in the direction Y2 and a small resistance in the direction Z2.

According to the present invention constructed as described above, by arranging the check valve 11 in parallel with throttle 10 or arranging check valve 21 to be integrated with throttle 20 respectively, a continuous fluid supply is secured from the master cylinder 1 to the second fluid inlet 8 of the modulator by way of each of the check valves even when no fluid exists in the expansion chamber 12. The above-mentioned arrangement enables the metal-edge control at the second fluid inlet 8 while interrupting fluid flow through the first fluid inlet 7 to sufficiently suppress the reverse pulsation, pump noise, vibration, and the like to the brake pedal.

EMBODIMENT 2

Figure 4:
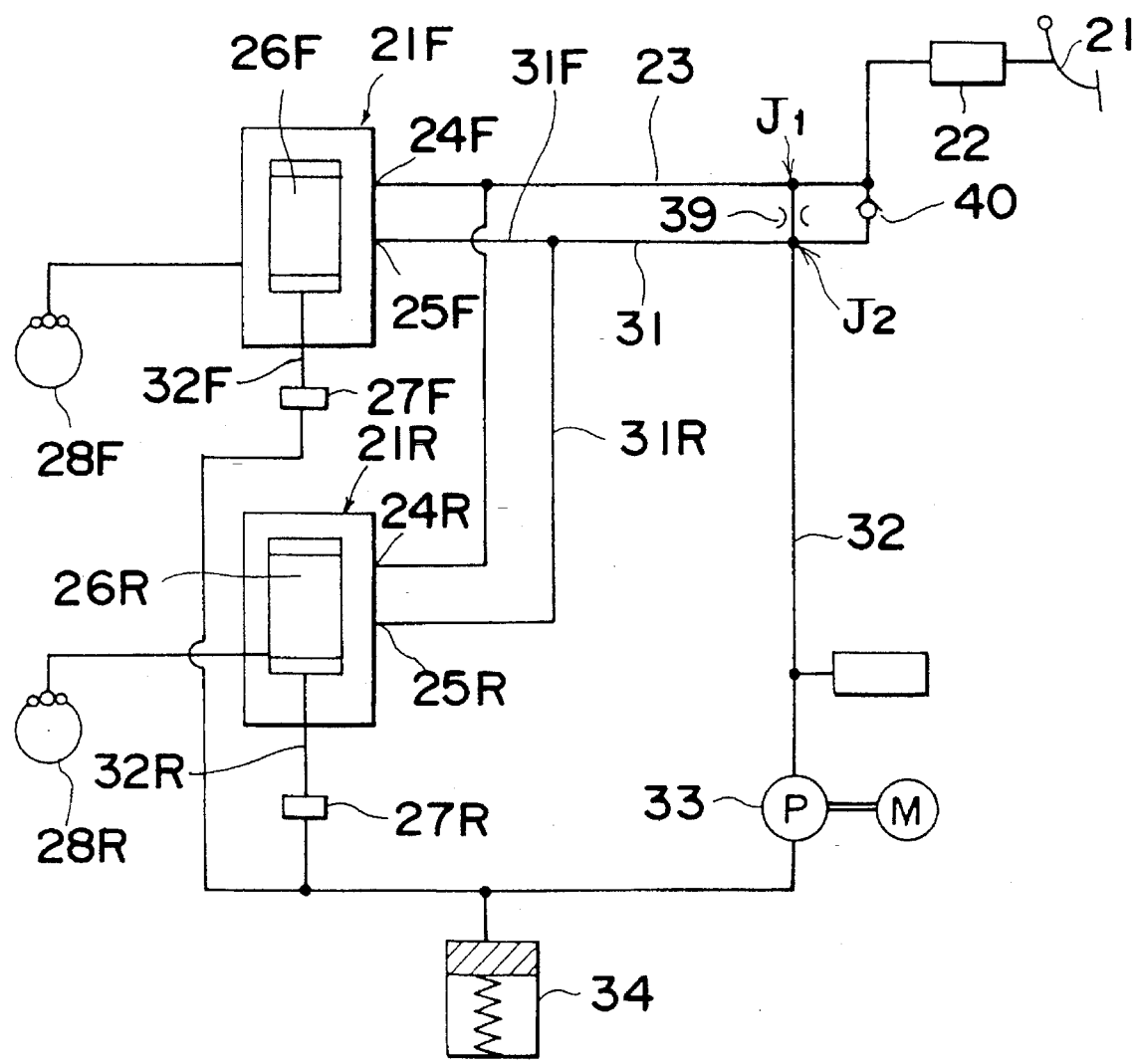
FIG. 4 is a schematic view for explaining a modified application of the first embodiment.
Figure 5:
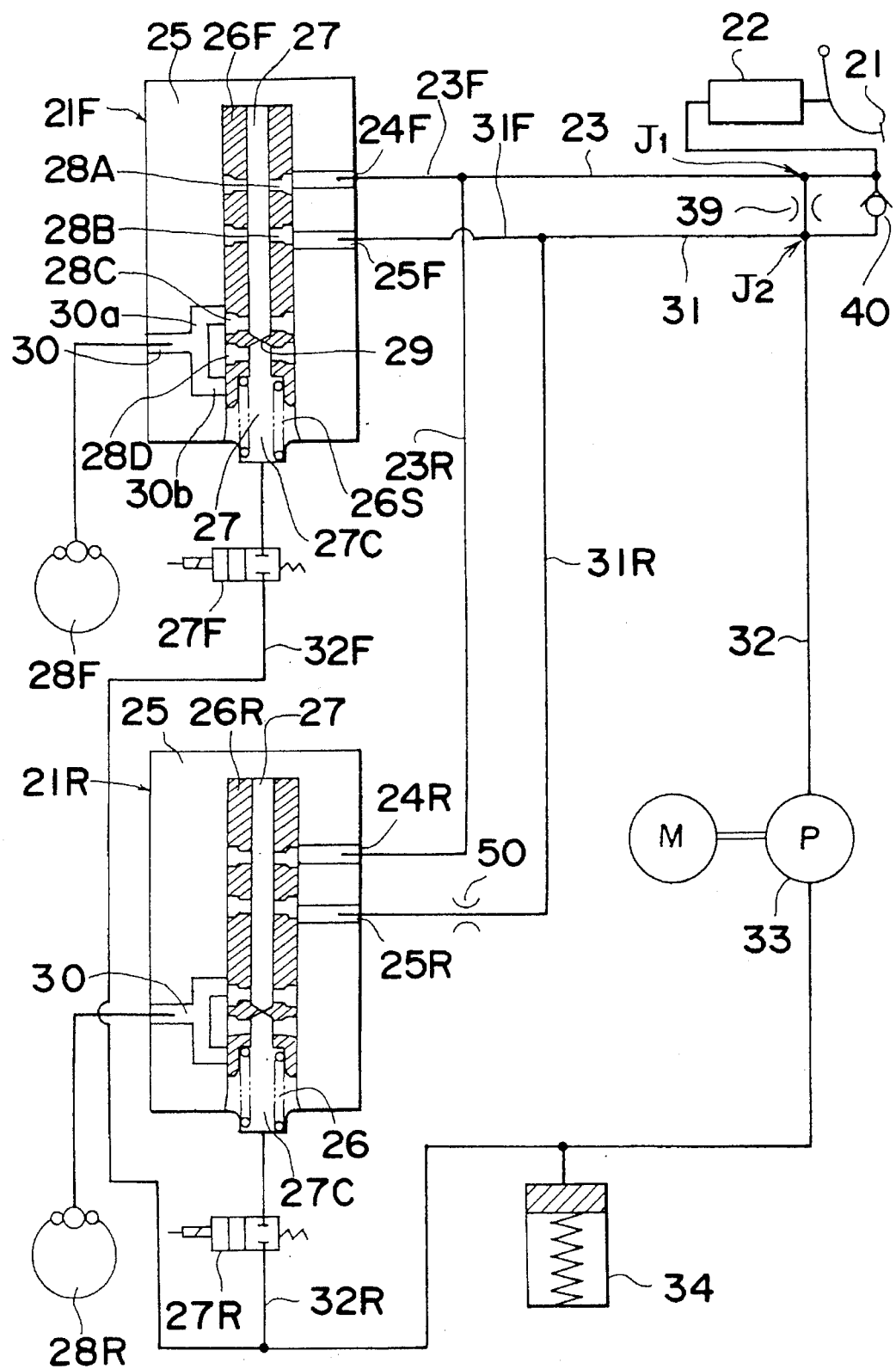
FIG. 5 is a schematic view illustrating the overall construction of a second embodiment of the present invention.
Figure 6:
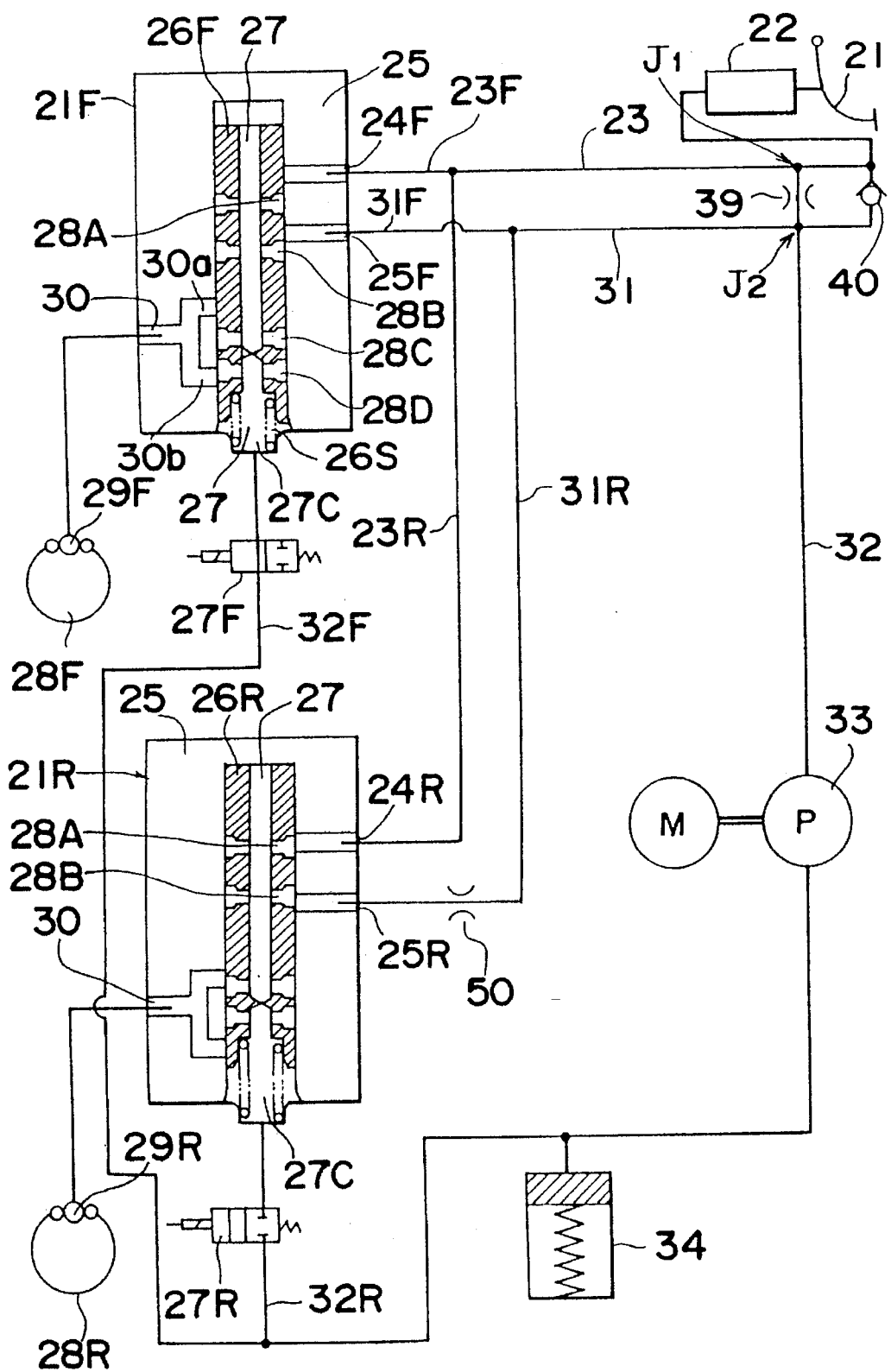
FIG. 6 is a schematic view illustrating an antilock control operation condition of the second embodiment shown in FIG. 5.
Figure 7:
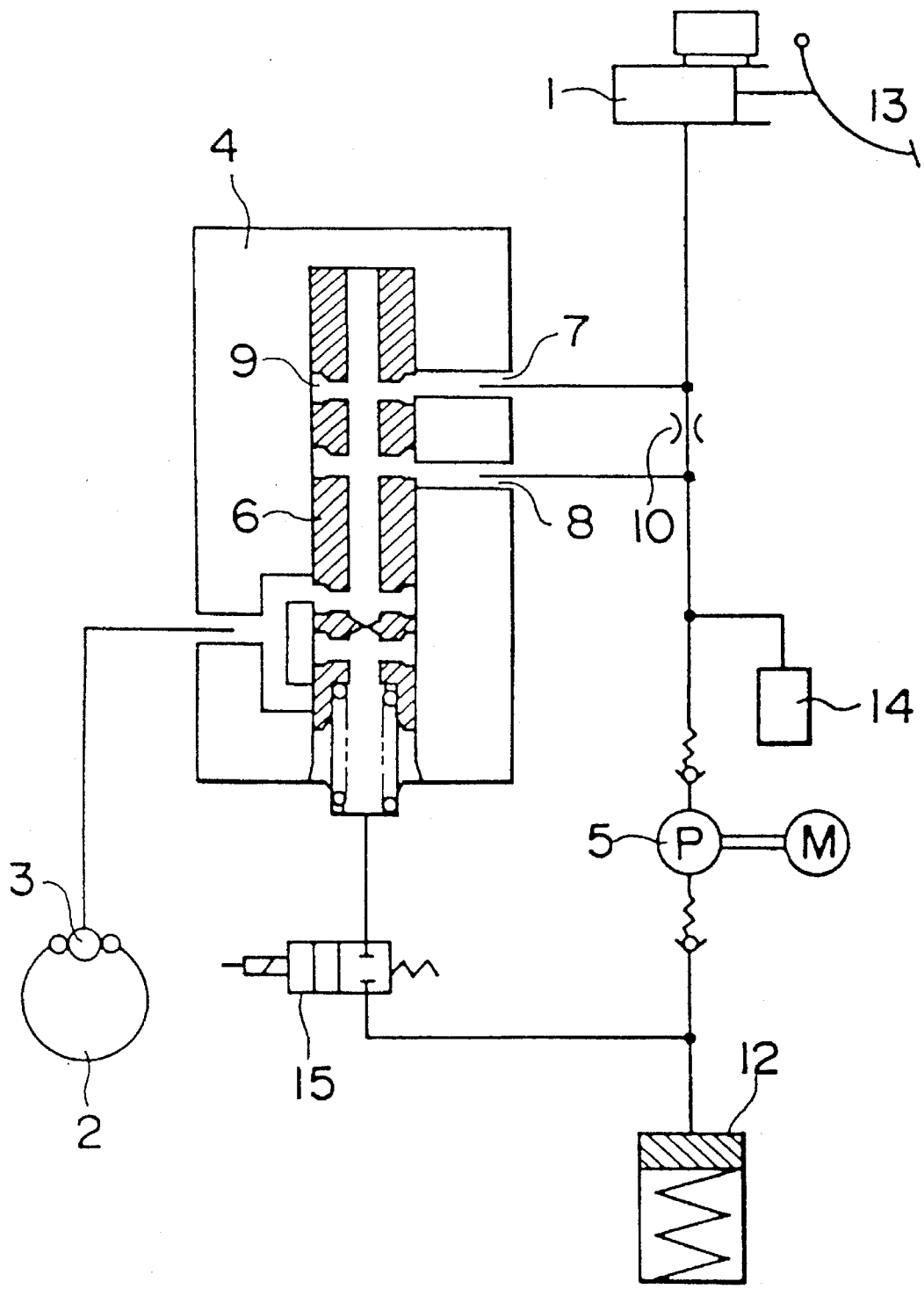
FIG. 7 is a schematic view of a conventional antilock brake control system in a condition before effecting antilock control.
Figure 8:
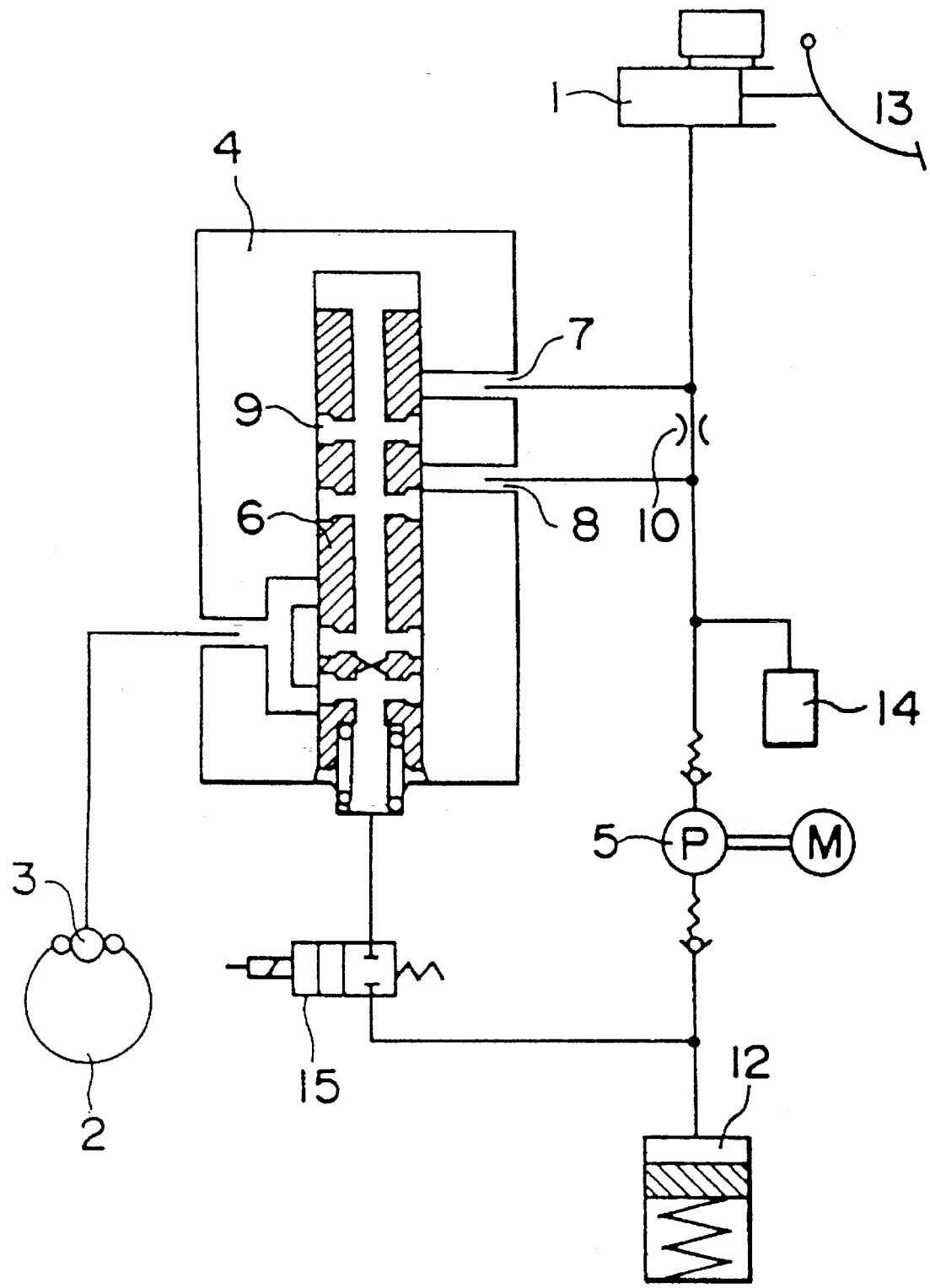
FIG. 8 is a schematic view of a conventional antilock brake control system in effecting antilock control.
Figure 6:
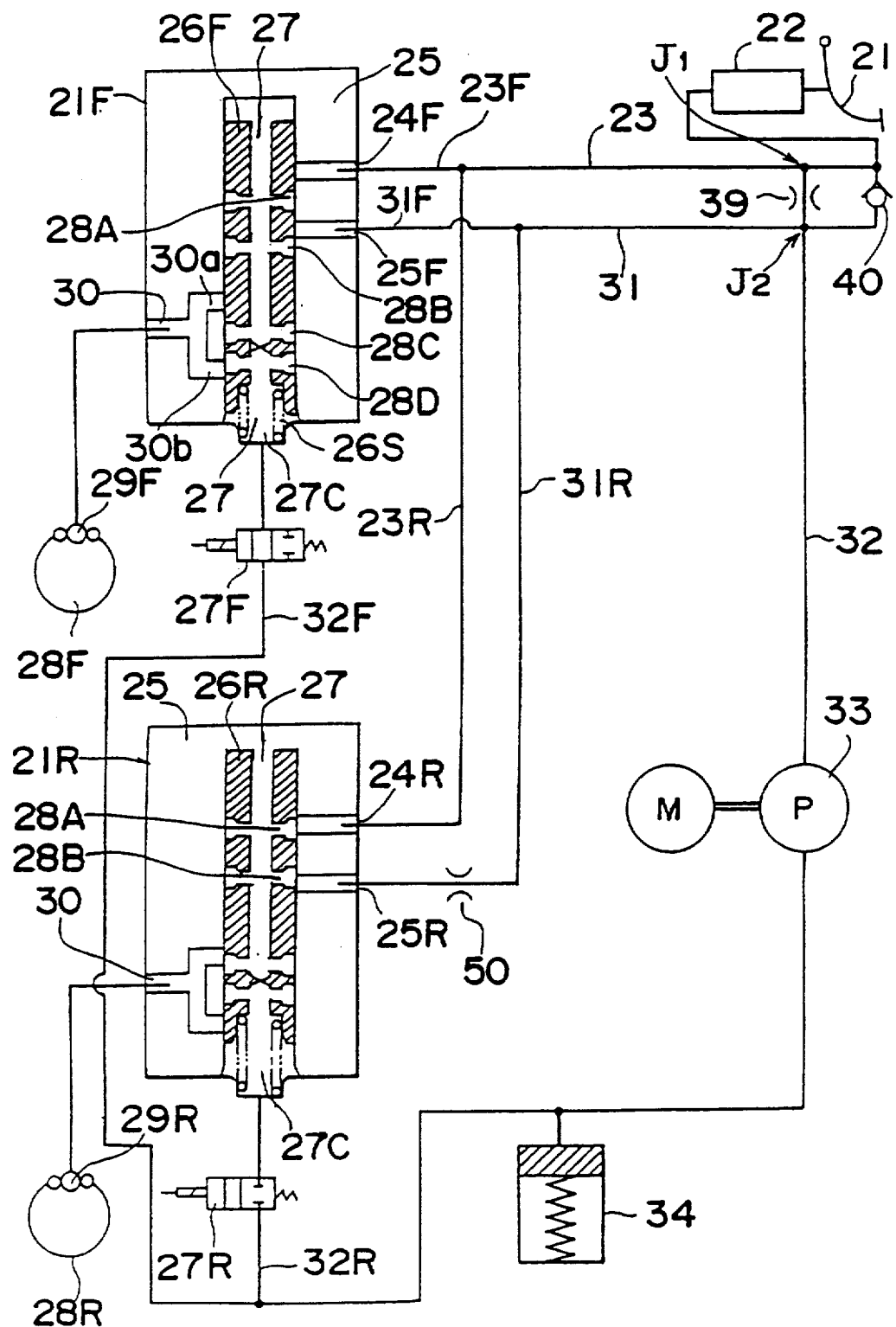

The following describes a second embodiment of the present invention with reference to FIGS. 4 through 6.

FIG. 4 shows a modified example of the first embodiment of an antilock brake control fluid pressure system when antilock control is effected on a front wheel and no antilock control is effected on a rear wheel in the case where the front wheel and the rear wheel belong to an identical piping system such as a diagonally configured and connected piping system.

In the case where right or left one of front wheels 28F and right or left one of rear wheels 28R are connected to an identical piping system such as a diagonally configured and connected piping system by means of a reflux type brake control system, one main fluid path 23 diverges to be connected to two flow control modulators 21F and 21R corresponding to wheel brakes 29F and 29R respectively. Flow control valves 26F and 26R are vertically slidably mounted in the modulators 21F and 21R respectively. Reflux fluid paths 32F and 32R for outlet connected to the flow control modulators 21F and 21R respectively are provided with solenoid valves (27F, 27R) for drain thereon and converge on reflux fluid path 32 which is provided with an expansion chamber 34 and a reflux pump 33 thereon.

When the above-mentioned spool type flow control valve is used, first inlets (24F, 24R) and second inlets (25F, 25R) are provided respectively in the spool type flow control modulators 21F and 21R respectively as shown in FIG. 4. The first inlets 24F and 24R are communicated with a master cylinder 22 by way of a main fluid path 23 without any restriction on fluid flow, and the spool type flow control valves 26F and 26R respectively provided in the flow control modulators 21F and 21R are moved by virtue of a pressure difference between fluid pressure at the master cylinder and fluid pressure at the wheel brake. When an antilock control operation is effected, the solenoid valves 27F and 27R are turned on to be opened for outlet fluid flow thereby to discharge brake operation fluid from the wheel brakes 29F and 29R, and the flow control valves 26F and 26R are moved downward to cut off the first inlets 24F and 24R respectively.

On the other hand, the above-mentioned second inlets 25F and 25R are communicated with branching fluid paths 31F and 31R of a second main fluid path 31 which is connected to the master cylinder 22 by way of a throttle 39 and a check valve 40, and the branching fluid paths 31F and 31R are connected to the reflux fluid path 32 on the side of an outlet of the pump 33 by way of a conjunction J2. The check valve 40 is provided in parallel with the throttle 39 in a bypass manner, which is the essence of the first embodiment.

However, there is sometimes a case where antilock control is effected only on one wheel and no antilock control is required to be effected on the other wheel belonging to an identical piping system depending on the road surface conditions and brake force. For example, when antilock control is effected only on the front wheel brake 29F and no antilock control is effected on the rear wheel brake 29R, the pressure at the rear wheel brake 29R is the same as the pressure in the master cylinder 22. Therefore, the flow control valve 26R of the rear wheel modulator 21R is in the position before effecting antilock control even if the check valve 40 is provided.

Therefore, when the operation fluid reduced in pressure from the front wheel brake 29F belonging to the identical system is pumped up by way of the expansion chamber 34 by the pump 33, pulsation of the pump is transmitted to the master cylinder 22 by way of the flow control valve 26R of the rear wheel modulator 21R and through the first inlet 24R. The above phenomenon also results in a bad pedal feeling as well as in serious pump noise.

Accordingly, in order to eliminate the above-mentioned problems which occur in the case where one of the front wheels and one of the rear wheels belong to an identical piping system such as a diagonally configured and connected piping system, a throttle 50 is provided in a branching fluid path 31R communicating the outlet side of the pump 33 with the second inlet 25R as shown in FIG. 5.

In a diagonally configured and connected piping system or the like in which one of the front wheels and one of the rear wheels belong to an identical piping system as mentioned above, a possible condition where antilock control is effected only on one wheel while no antilock control is required to be effected on the other wheel belonging to the identical system is almost all the cases a condition such that the front wheel brake requires antilock control and the rear wheel brake requires no antilock control because of vehicle conditions and other factors. Therefore, it is required, when antilock control is effected only on the front brake, to reduce pulsation caused by a pump output transmitted by way of the flow control valve of the rear wheel modulator belonging to the identical system. For the above reasons, there is provided the aforementioned throttle 50 in the branching fluid path communicated with the second inlet 25R of the flow control valve 26R of the rear wheel modulator 21R.

It may be possible to provide a throttle in the branching fluid path 31F communicated with the second inlet 25F of the flow control valve 26F for the front wheel 28F. However, in the above case, the throttle is required to have an operation range such that it does not damage the pump.

Referring to FIGS. 5 and 6, according to the second embodiment of the present invention, a brake system as shown in FIG. 5 has the same overall construction as shown in FIG. 4 except for a major difference that a throttle 50 is provided in the branching fluid path 31R for pump delivery connected to the second inlet 25R of the flow control valve 26R for the rear wheel brake 29R.

It is noted here that the same components and constructions as those in FIG. 4 are denoted by the same numerals in FIGS. 5 and 6.

In the second embodiment employing a diagonally configured and connected piping system, the right front wheel 28F and the left rear wheel 28R are connected to an identical piping system, while the same piping system is provided for the left front wheel and the right rear wheel.

Therefore, branching fluid paths 23F and 23R are provided in the downstream of the main fluid path 23 connected to the master cylinder 22 which is operated by a brake pedal 21. The branching fluid paths 23F and 23R are connected to the front wheel brake 29F and the rear wheel brake 29R by way of the flow control valves 26F and 26R respectively.

Each of the flow control valves 26F and 26R is of the spool type and moves vertically in the figure according to the pressure difference between the master cylinder pressure and the wheel brake pressure in the same manner as that in the conventional one, the flow control modulators 21F and 21R having the same construction each other. Therefore, reference is made only to the flow control modulator 21F.

The flow control modulator 21F receives therein the spool type flow control valve 26F axially and slidably in an axial hole of a housing 25 with one end of the flow control valve 26F biased by means of a spring 26 to hold the flow control valve 26F in its normal position in the normal brake mode (position before effecting antilock control) as indicated in FIG. 5. A through hole 27 is formed axially and centrally in the flow control valve 26F. A first port 28A, a second port 28B, a third port 28C, and a fourth port 28D are formed at appropriate intervals in the axial direction as communicated with the through hole 27. There is provided an orifice 29 formed between the third port 28C and the fourth port 28D in the through hole 27.

In the housing 25, the first inlet 24F is communicated with the branching fluid path 23F of the main fluid path 23, while the second inlet 25F independent from the first inlet 24F is communicated with the branching path 31F. There is formed an outlet 30 communicated with the wheel brake 28F in communication with the through hole 27, while a drain outlet 27c for antilock control is provided at an axial end. It is noted that the outlet 30 is diverged, on the side in communication with the through hole 27, into a first outlet 30a and a second outlet 30b.

The above-mentioned discharge outlet 27c is communicated with the branching reflux fluid path 32F. The branching reflux fluid path 32F is provided with a solenoid valve 27F for drain which is normally closed and driven into an open position when antilock control is effected. The branching reflux fluid path 32F is communicated with a main reflux fluid path 32 together with a branching reflux fluid path 32R of the rear wheel brake 28R.

The main reflux fluid path 32 includes from upstream an expansion chamber 34 and a pump 33 which is driven by a motor M. The reflux fluid path 32 on the outlet side of the pump 33 is communicated with the master cylinder 22 by way of the throttle 39 and the check valve 40. The reflux fluid path 32 is also communicated with a branching fluid path 31 by way of the conjunction J2 thereby to be communicated with the second inlets 25F and 25R of the flow control valves 26F and 26R.

The branching fluid path 31F is communicated with the main fluid path 23 by way of the throttle 39 and the check valve 40 in the upstream of the converging point with the reflux fluid path 32 on the side of the master cylinder. The second main fluid path 31 is diverged into two branching fluid paths 31F and 31R which are communicated with the second inlets 25F and 25R of the flow control modulators 21F and 21R respectively.

A throttle 50 is provided in the branching fluid path 31R communicated with the second inlet 25R of the flow control modulator 21R of the rear wheel.

In the brake system having the above-mentioned construction, the solenoid valves 27F and 27R are in their closed positions as shown in FIG. 5 in the normal operation mode, and the flow control valves 26F and 26R in the modulators 21F and 21R are positioned in their upper ends as biased by the spring 26S. In the above conditions, the first port 28A of each flow control valve is communicated with the first inlet 24F (24R), the second port 28B is communicated with the second inlet 25F (25R), and the third port 28C is communicated with the outlet 30. Therefore, the master cylinder 22 is communicated with the wheel brakes 28F and 28R by way of the first and second inlets 24F (24R) and 25F (25R), with which the fluid pressure generated in the master cylinder 22 in accordance with an operation of the brake pedal 21 is supplied to the front wheel brake 29F and the rear wheel brake 29R.

Referring to FIG. 6, when antilock control is effected on the front wheel brake 29F and no antilock control is required to be effected on the rear wheel brake 29R, only the solenoid valve 27F of the front wheel is turned on to be open for the fluid flow, while the solenoid valve 27R of the rear wheel remains in its closed condition.

Therefore, on the side of the rear wheel brake, the first port 28A of the flow control valve 26R is communicated with the first inlet 24R, while the second port 28B is communicated with the second inlet 25R in the same manner as shown in FIG. 5. In other words, the second inlet 25R and the first inlet 24R are communicated with each other by way of the through hole 27 of the flow control valve 26R, while the operation fluid flowing from the branching fluid path 31R is made to flow to the master cylinder 22 through the main fluid path 23.

On the side of the front wheel brake, the solenoid valve 27F for drain is turned on to discharge the operation fluid from the wheel brake 28F by way of the outlets 30 and 30b in the front modulator 21F, and the operation fluid is drained to the branching reflux fluid path 32F through the drain outlet 27c. The flow control valve 26F descends while compressing the spring 26S by an operation fluid pressure effecting on the orifice 29.

With the draining of the operation fluid to the reflux fluid path 32 from the front wheel brake 29F, the drained operation fluid is charged in the expansion chamber 34, and the pump 33 is driven by the motor M simultaneously with the ON operation of the front solenoid valve 27F according to an antilock signal. Thus, the operation fluid is pumped up by the pump 33 out of the expansion chamber 34 and deliver the operation fluid to the second fluid path 31.

The pump delivery fluid which has flown into the reflux fluid path 32 diverges into two directions to be made to return to the master cylinder 22 by way of the throttle 39 on one hand and to be fed to the second main fluid path 31 delivered to the branching fluid paths 31F and 31R on the other hand. The second inlet 25F communicated with the branching fluid path 31F of the front wheel is slightly and intermittently communicated with the second port 28B by means of the flow control valve member 26F under a metal-edge control.

On the other hand, the second inlet 25R of the rear wheel modulator 21R communicated with the branching fluid path 31R is communicated with the first inlet 24R by way of the through hole 27 of the flow control valve 26R as described hereinbefore. Therefore, the pump delivery fluid and pump output from the branching fluid path 31R is made to return from the second inlet 25R to the master cylinder 22 by way of the through hole 27, the first inlet 24R and through the main fluid path 23.

In the above case, the delivery fluid and the delivery output are restricted by the throttle 50 provided in the rear branching fluid path 31R to permit the reduction of pump noise and pulsation which are transmitted to the master cylinder to thereby improve the pedal feeling.

It is noted here that a throttle 50 may be provided in the front branching fluid path 31F communicated with the second inlet 25F of the front wheel. However, in such a case, the throttle is required to have an operation range so as not to damage the pump.

The brake system of the present invention is not limited to a diagonally configured and connected piping system and the present invention can be also applied to a parallel type piping system in which a right front wheel and a right rear wheel are connected to an identical piping system while a left front wheel and a left rear wheel are connected to an identical piping system.

According to the present invention as described above, in a diagonally configured and connected piping system brake system employing a spool type flow control valve for antilock control, the transmission of pump delivery fluid pressure to the master cylinder can be effectively suppressed by providing a throttle in the relevant fluid path when antilock control is effected on the front wheel while no antilock control is effected on the rear wheel. With the above-mentioned arrangement, the present invention has an advantage of suppressing the pump noise and pedal pulsation when antilock control is effected.

Although the present invention has been fully described by way of examples with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An antilock brake control fluid pressure system having right and left front wheel brake units and right and left rear wheel brake units belonging to an identical piping system, each piping system comprising one front brake unit and one rear brake unit, for effecting antilock control by applying a fluid pressure from a master cylinder generated in accordance with a braking operation to the respective brake unit to apply a braking pressure to a pair of front and rear wheels and reducing the fluid pressure applied to the respective brake unit upon detection of a symptom of locking of the wheel, said antilock brake control fluid pressure system comprising:

a first spool type modulator in fluid communication with either said front wheel brake unit or said rear wheel brake unit and a second spool type modulator in fluid communication with the other of said front wheel brake unit or said rear wheel brake unit, each of said modulators having a body member, a drain outlet and a spool type flow control valve member which slidably moves in the body member of the respective modulator according to a pressure difference between a fluid pressure at the master cylinder and a fluid pressure at the respective brake unit, said flow control valve member being formed with a main fluid path communicating from the master cylinder to the respective brake unit, each said modulator comprising at least one first inlet which is in fluid communication with the master cylinder by way of a first main fluid path without any restriction of fluid flow and which is closed by the body member of said flow control valve member so as to cut off the fluid flow therethrough when effecting antilock control, and each said modulator comprising at least one second inlet which is in fluid communication with the master cylinder by way of a branching fluid delivery path diverging from a second main fluid path at a location downstream of the master cylinder and upstream of said modulators;

a pump system for supplying brake pressure fluid drained from the drain outlets of said first and second modulators to the at least one second fluid inlet of said first and second modulators; and a throttle and a check valve arranged in parallel with each other between the first inlet and the at least one second inlet of each said modulator, the check valve being constructed to permit fluid flow only in one direction from the first fluid inlet to the at least one second fluid inlet of each said modulator;

said first modulator being disposed upstream of a first reflux path and said second modulator being disposed upstream of a second reflux path, each reflux path having a solenoid valve which is turned on when antilock control is effected, and which is in fluid communication with the flow control valve member of each of said first or second modulator, each of the reflux fluid paths converging on a main reflux fluid path having therein said pump system including an expansion chamber and a pump, and a pump outlet side of the main reflux fluid path being in fluid communication with the branching fluid delivery path downstream of the check valve and the throttle;

the antilock brake system further comprising a second throttle, which is provided in the branching fluid delivery path to the second modulator, said second throttle being disposed upstream of said at least one second inlet of said second modulator and downstream of said location at which the branching fluid delivery path diverges, and which is in fluid communication with the outlet side of the pump to the at least one second inlet of said second modulator, wherein said second throttle is constructed and arranged such that transmission of fluid pulses through said second modulator is essentially prevented.

2. The system as claimed in claim 1, wherein said second throttle is provided in the branching fluid delivery path which is in fluid communication with the at least one second inlet of the second modulator and said second modulator is in fluid communication with the rear wheel brake unit.

* * * * *

UNITED STATES PATENT AND TRADEMARK OFFICE
CERTIFICATE OF CORRECTION

PATENT NO. : 5,474,371
DATED : December 12, 1995
INVENTOR(S) : T. SHINOMIYA

It is certified that error appears in the above-indentified patent and that said Letters Patent is hereby corrected as shown below:

On title page, in section [54], The Title, line 3, change "VALUE " to ---VALVE---.

At column 5, line 61, change "on" to ---or---.

At column 5, line 64, change "on" to ---or---.

Fig. 6 should be replaced by the attached amended Fig. 6.

Signed and Sealed this

Fifteenth Day of October, 1996

Attest:

BRUCE LEHMAN

*Attesting Officer*     *Commissioner of Patents and Trademarks*